March 27, 1928.
W. P. McMILLAN
GARDEN HOE
Filed Aug. 27, 1925
1,663,716
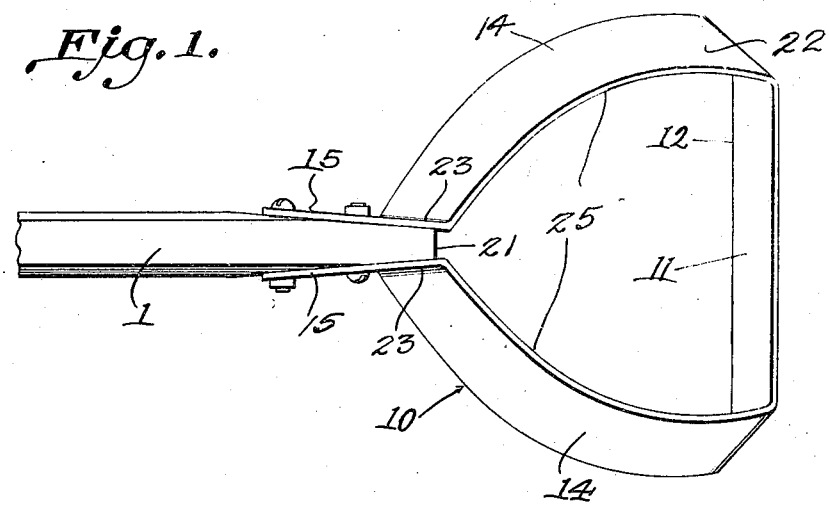
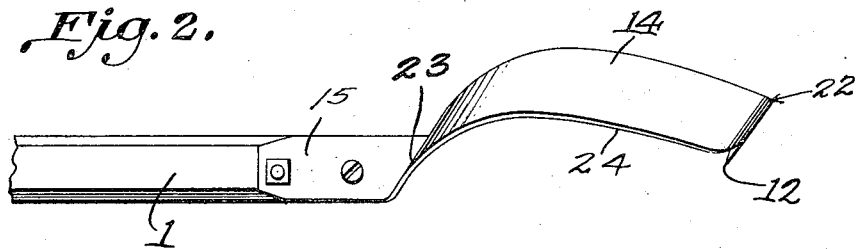
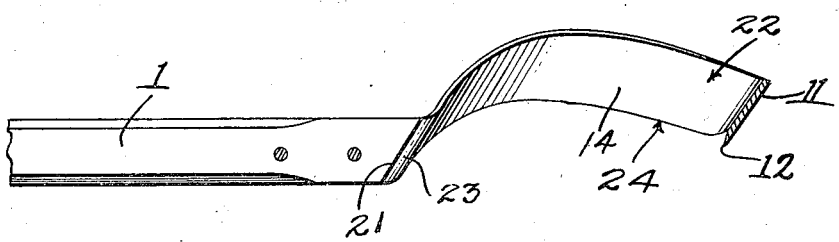
W. P. McMillan
Inventor
By C. A. Snow & Co.
Attorneys Patented Mar. 27, 1928.

1,663,716

UNITED STATES PATENT OFFICE.

WILLIAM PERRY McMILLAN, OF PUNTA GORDA, FLORIDA.

GARDEN HOE.

Application filed August 27, 1925. Serial No. 52,918.

This invention relates to agricultural implements and more particularly to hoes designed for gardening and other purposes.

The object of the invention is to provide an implement of this character which is so constructed that it may be used for a variety of purposes, but primarily as a garden hoe.

In the accompanying drawings:—

Figure 1 represents a plan view of a hoe constructed in accordance with this invention;

Figure 2 is a side elevation thereof; and

Figure 3 is a longitudinal section.

The hoe hereinafter claimed comprises a handle 1, the inner end 21 of which is oblique, and a soil-engaging member 22 including a flat cross bar 11 having a working edge 12 which is straight from end to end, the soil-engaging member 22 including side pieces 14 joined to the ends of the cross bar 11 and provided with arms 15 attached to opposite sides of the handle 1, the side pieces 14 being bent obliquely as shown at 23, at said oblique end 21 of the handle 1, where the side pieces 14 are connected to the arms 15, and being thence bowed laterally, as at 24, and outwardly as at 25, so that the axis of the handle 1 intersects the aforesaid working edge 12 of the cross bar 11.

This implement may be used for a great many purposes and being constructed of comparatively narrow strap metal is especially designed for hoeing delicate plants without danger of breaking them and it may be used to cut weeds either by pushing it backward or moving it forward. If the blade or cross bar 11 be sufficiently sharpened and made of proper steel the device may be used for skinning bark off trees and the like.

I claim:—

A hoe comprising a handle, the inner end of which is oblique, and a soil-engaging member including a flat cross bar having a working edge which is straight from end to end, the soil-engaging member including side pieces joined to the ends of the cross bar and provided with arms attached to opposite sides of the handle, the side pieces being bent obliquely at said oblique end of the handle, where the side pieces are connected to the arms, and being thence bowed laterally and outwardly, so that the axis of the handle intersects the aforesaid working edge of the cross bar.

In testimony that I claim the foregoing as my own, I have hereto affixed my signature.

WILLIAM PERRY McMILLAN.